United States Patent
Ota et al.

(10) Patent No.: US 6,884,827 B2
(45) Date of Patent: Apr. 26, 2005

(54) SEAL RING AND SEAL DEVICE

(75) Inventors: Tomohito Ota, Yokohama (JP); Tomihito Hashimoto, Tokyo (JP); Yasuaki Yamamoto, Hitachi (JP); Hiroo Kusano, Hitachi (JP)

(73) Assignees: Nissan Motor Co., Ltd., Kanagawa-ken (JP); Hitachi Cable Ltd., Tokyo (JP)

(*) Notice: Subject to any disclaimer, the term of this patent is extended or adjusted under 35 U.S.C. 154(b) by 72 days.

(21) Appl. No.: 10/403,284

(22) Filed: Apr. 1, 2003

(65) Prior Publication Data
US 2003/0189295 A1 Oct. 9, 2003

(30) Foreign Application Priority Data
Apr. 3, 2002 (JP) .................................... P2002-101571
Sep. 12, 2002 (JP) .................................... P2002-266256

(51) Int. Cl.⁷ ............................ C08L 27/18; C08K 3/04
(52) U.S. Cl. ................. 522/156; 522/150; 522/155; 522/111; 522/112; 524/440; 524/544; 524/545; 524/546; 524/439; 524/551; 264/330; 264/331.11; 264/331.14
(58) Field of Search ................ 522/150, 155, 522/156, 109, 110, 111, 112; 524/440, 544, 545, 546, 439, 551; 264/330, 311.11, 311.14

(56) References Cited

U.S. PATENT DOCUMENTS 5,428,096 A * 6/1995 Fukunaga .................... 524/440
6,552,099 B1 * 4/2003 Yamamoto et al. .......... 522/156

* cited by examiner

*Primary Examiner*—James J. Seidleck
*Assistant Examiner*—Sanza L McClendon
(74) *Attorney, Agent, or Firm*—McDermott Will & Emery LLP (57) ABSTRACT

A seal ring seals operating oil hermetically and is attached to an annular seal ring groove provided on an outer circumference of a shaft member. The seal ring comprises fluororesin, metal powder having a hardness equal to or more than that of any of a side surface of the seal ring groove serving as a sliding partner and an inner circumferential surface of a housing engaged relatively rotatable with the outer circumference of the shaft member, and modified fluororesin formed by irradiating an ionizing radiation in a range from 1 kGy to 10 MGy inclusive in a state of being heated up to a melting point thereof or higher under an inert gas atmosphere with an oxygen partial pressure of 1.33 kPa or less.

19 Claims, 7 Drawing Sheets

SEAL RING AND SEAL DEVICE

BACKGROUND OF THE INVENTION

1. Field of the Invention

The present invention relates to a seal ring used for hermetically sealing operating oil of relative rotation portions in an automatic transmission mainly used in an automobile or the like and to a hydraulics seal device using the seal ring.

2. Description of the Related Art

Heretofore, an automatic transmission used in a vehicle such as an automobile has included a torque converter, gears, a brake and a multi-plate clutch. The automatic transmission (hereinafter, also referred to as "AT") requires a clutch engagement for transmission and adopts a construction in which this clutch engagement is performed by oil pressure. Therefore, sealing is required for relatively rotating portions in a hydraulics circuit, a seal ring is provided in a ring groove in one of the members constructing the portions, and the seal ring is designed to slidingly contact the sidewall surface of the ring groove while being thrust on an outer circumference (or inner circumference) of a partner material by the oil pressure.

In recent years, such a seal ring has gradually been changed from a conventional ring made of cast iron to a ring made of synthetic resin which allows closer contact with the partner material and has excellent sealing properties. However, since the seal ring made of synthetic resin has good contact properties, friction torque on a slidingly contacting surface with the partner material is increased. Therefore, various techniques for reducing the friction torque have been employed.

For example, as a technique for reducing the friction torque of the seal ring made of synthetic resin, a method is known, in which fluororesin such as polytetrafluoroethylene excellent in low friction torque property is used for the base material of the seal ring.

SUMMARY OF THE INVENTION

However, while the fluororesin has an excellent low friction torque property, the fluororesin also exhibits an oil repellent property because its surface energy is small, and therefore, the seal ring cannot retain an oil film of the slidingly contacting surface in sliding conditions, particularly under high surface pressure where the oil film is thinned. Thus, there has been a problem in that the friction torque and the amount of self-abrasion are increased as the time elapses.

Since the fluororesin has a poor creep-resistant property, particularly at high temperature, the sealing property thereof is prone to be lowered. Therefore, in general, the fluororesin is used by being added with a fiber filler material such as glass fiber and carbon fiber or a metal filler material in order to improve the creep-resistant property. However, if such a filler material is added to the fluororesin, when an inner circumferential surface of a seal ring groove or a housing serving as a partner during the sliding movement is non-iron metal such as an aluminum alloy, the abrasion on the partner side during the sliding movement has sometimes been increased, thus deteriorating the sealing property.

On the other hand, if the fiber filler material and the metal filler material are not added to the fluororesin in order to prevent the above-described abrasion, the improvement of the load-resistant property is insufficient, and the self-abrasion of the seal ring under the high surface pressure is increased, thus also deteriorating the sealing property, which has been regarded as a problem.

The present invention is made focusing on the problems described above in the related art. It is an object of the present invention to provide a seal ring capable of contributing to the improvement of fuel consumption of an automobile by effectively reducing the friction torque on a sliding surface thereof without damaging the sealing property during an operation under high pressure, and to provide a hydraulics seal device.

The first aspect of the present invention provides a seal ring which seals operating oil hermetically and is attached to an annular seal ring groove provided on an outer circumference of a shaft member, the seal ring comprising: fluororesin; metal powder having a hardness equal to or more than that of any of a side surface of the seal ring groove serving as a sliding partner and an inner circumferential surface of a housing engaged relatively rotatable with the outer circumference of the shaft member; and modified fluororesin formed by irradiating an ionizing radiation in a range from 1 kGy to 10 MGy inclusive in a state of being heated up to a melting point thereof or higher under an inert gas atmosphere with an oxygen partial pressure of 1.33 kPa or less, wherein the seal ring comprises an inner ring circumferential surface facing an inside thereof in a radius direction, an outer ring circumferential surface facing an outside thereof in the radius direction, and a pair of side ring surfaces facing both sides thereof in an axial direction, and when oil pressure is applied to the seal ring, the outer ring circumferential surface is pressed against the inner circumferential surface of the housing, one of the side ring surfaces is pressed against the side surface of the seal ring groove, thus retaining the oil pressure.

The second aspect of the present invention provides a seal ring which seals operating oil hermetically and is attached to an annular seal ring groove provided on an outer circumference of a shaft member, the seal ring comprising: fluororesin; synthetic resin having a surface energy ranging from +0 N/cm to $20 \times 10^{-5}$ N/cm inclusive of that of the operating oil; and metal powder having a hardness equal to or more than that of any of a side surface of the seal ring groove serving as a sliding partner and an inner circumferential surface of a housing engaged relatively rotatable with the outer circumference of the shaft member, wherein the seal ring comprises an inner ring circumferential surface facing an inside thereof in a radius direction, an outer ring circumferential surface facing an outside thereof in the radius direction, and a pair of side ring surfaces facing both sides thereof in an axial direction, and when oil pressure is applied to the seal ring, the outer ring circumferential surface is pressed against the inner circumferential surface of the housing, one of the side ring surfaces is pressed against the side surface of the seal ring groove, thus retaining the oil pressure.

The third aspect of the present invention provides a hydraulics seal device, comprising: a seal ring which seals operating oil hermetically and is attached to an annular seal ring groove provided on an outer circumference of a shaft member, the seal ring comprising: fluororesin; metal powder having a hardness equal to or more than that of any of a side surface of the seal ring groove serving as a sliding partner and an inner circumferential surface of a housing engaged relatively rotatable with the outer circumference of the shaft member; and modified fluororesin formed by irradiating an ionizing radiation in a range from 1 kGy to 10 MGy inclusive in a state of being heated up to a melting point thereof or higher under an inert gas atmosphere with an oxygen partial pressure of 1.33 kPa or less, wherein the seal ring comprises an inner ring circumferential surface facing an inside thereof in a radius direction, an outer ring circumferential surface facing an outside thereof in the radius direction, and a pair of side ring surfaces facing both sides thereof in an axial direction, when oil pressure is applied to the seal ring, the outer ring circumferential surface is pressed against the inner circumferential surface of the housing, one of the side ring surfaces is pressed against the side surface of the seal ring groove, thus retaining the oil pressure, and the seal ring slidingly contacts any of the side surface of the seal ring groove of the shaft member and the inner circumferential surface of the housing.

The fourth aspect of the present invention provides a hydraulics seal device, comprising: a seal ring which seals operating oil hermetically and is attached to an annular seal ring groove provided on an outer circumference of a shaft member, the seal ring comprising: fluororesin; synthetic resin having surface energy ranging from +0 N/cm to $20 \times 10^{-5}$ N/cm inclusive of surface energy of the operating oil; and metal powder having a hardness equal to or more than that of any of a side surface of the seal ring groove serving as a sliding partner and an inner circumferential surface of a housing engaged relatively rotatable with the outer circumference of the shaft member, wherein the seal ring comprises an inner ring circumferential surface facing an inside thereof in a radius direction, an outer ring circumferential surface facing an outside thereof in the radius direction, and a pair of side ring surfaces facing both sides thereof in an axial direction, when oil pressure is applied to the seal ring, the outer ring circumferential surface is pressed against the inner circumferential surface of the housing, one of the side ring surfaces is pressed against the side surface of the seal ring groove, thus retaining the oil pressure, and the seal ring slidingly contacts any of the side surface of the seal ring groove of the shaft member and the inner circumferential surface of the housing.

BRIEF DESCRIPTION OF THE DRAWINGS

The invention will now be described with reference to the accompanying drawings wherein.

DETAILED DESCRIPTION OF THE PREFERRED EMBODIMENT

Hereinafter, description will be made of embodiments of the present invention with reference to the drawings.

Figure 1:
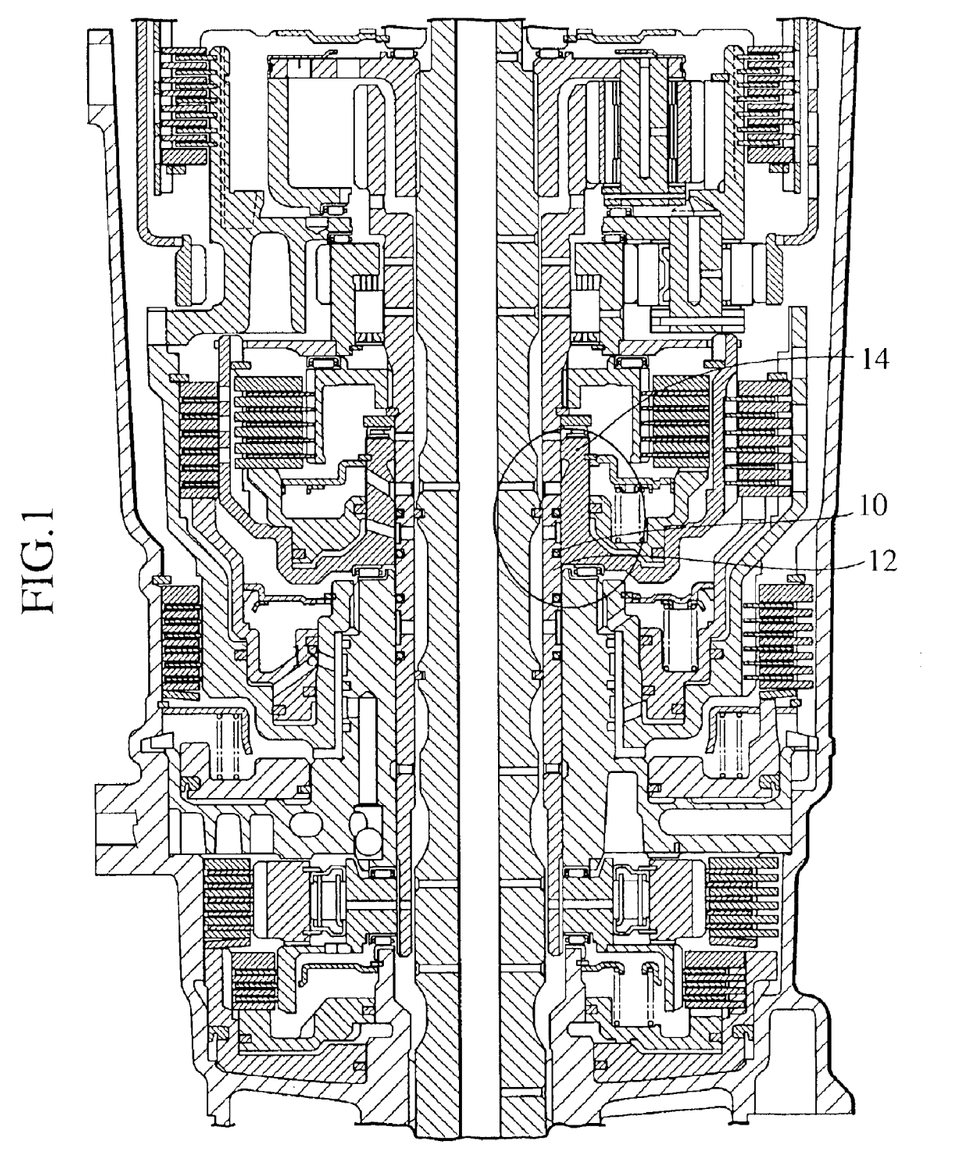
FIG. 1 is a cross-sectional view of a hydraulics seal portion of an automatic transmission for a vehicle, to which a seal ring of the present invention can be applied.
Figure 2:
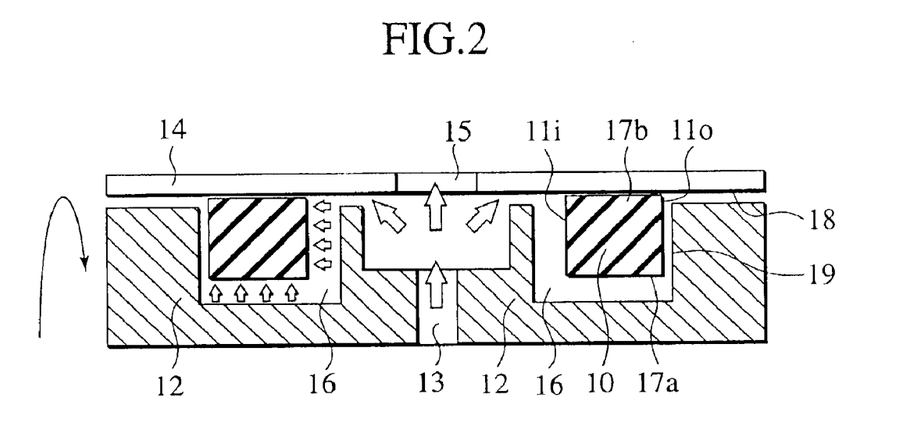
FIG. 2 is a partially enlarged cross-sectional view showing a usage of the seal ring in FIG. 1.

In FIGS. 1 and 2, if oil pressure is supplied from an oil path 13 of a shaft member 12 to an oil path 15 of a housing 14, then the oil pressure is also transmitted to each seal ring groove 16 to operate in an inner circumferential surface 17a and an inner side surface 11i of each seal ring 10. Therefore, the seal ring 10 exerts a sealing effect in such a manner that the outer circumferential surface 17b thereof is pressed against the inner circumferential surface 18 of the housing 14, and that the outer side surface 11o thereof, that is, the sealing surface is pressed against the sealing side surface 19 of the seal ring groove 16.

The friction torque generated between the outer circumferential surface 17b of each seal ring 10 and the inner circumferential surface 18 of the housing 14 is larger than the friction torque generated between both the sealing side surfaces (11o and 19) of the ring 10 and the seal ring groove 16. Therefore, if the housing 14 rotates with respect to the shaft member 12 in the state as described above, then the seal ring 10 rotates accompanied by the housing 14, and a relative rotation motion is generated on both the sealing side surfaces.

In a seal device having such a construction, if the body of the seal ring is made of synthetic resin, then the contact property thereof with the sealing side surface of the partner material is improved, and therefore, the sealing property is improved. However, the friction torque of the seal ring is increased.

On the other hand, as described above, as a technique for reducing the friction torque of the seal ring, there exists the method of using fluororesin such as tetrafluoroethylene which has an excellent low friction torque property for the base material of the seal ring. While the fluororesin has an excellent low friction torque property, the resin has poor abrasion-resistant and load-resistant properties. Therefore, the self-abrasion/deformation of the seal ring is increased under high surface pressure, and thus it becomes impossible to retain the sealing property.

Heretofore, in order to achieve the improvement of, particularly, the load-resistant property of the fluororesin, generally, a fiber filler material such as glass fiber and carbon fiber has been added thereto. However, if the side surface of the seal ring groove and the inner circumferential surface of the housing are made of non-iron metal such as aluminum, and if the seal ring is put under a severe sliding condition of PV=40 MPa·m/s or more, then a fiber edge protruding to the surface of the seal ring and fiber which has fallen off from the seal ring accelerate the abrasion of the non-iron metal as the partner of the sliding, sometimes resulting in damage to the sealing property.

Accordingly, in the present invention, in order to achieve an improvement in the load-resistant property of the fluororesin, and simultaneously, in order to suppress the abrasion of the side surface of the ring or inner circumferential surface of the housing, which is the partner material made of soft non-iron metal such as aluminum, metal powder having a Vickers hardness equivalent to or more than that of the partner material is compounded with the fluororesin.

Similarly, as to the fiber filler material, the above-described metal powder can reinforce the fluororesin to improve the load-resistant property thereof. In addition, a hard fiber edge does not appear on the surface of the seal ring. Therefore, it is made possible to suppress the attacking property of the partner material. Moreover, by such compounding, the thermal radiation property of the fluororesin as the base material of the seal ring is improved, and the load-resistant property at high temperature, which is a subject in the fluororesin such as polytetrafluoroethylene, is also improved.

The surface hardness of the seal ring is increased to be more than that of the non-iron metal, and adhesion between soft non-iron metal such as aluminum and the seal ring is reduced, thus making it possible to suppress the abrasion of the non-iron metal. Therefore, particularly, if the partner material is the soft non-iron metal, then the metal powder compounded with the fluororesin must be harder than the partner material.

As such a metal powder, bronze powder or stainless steel powder is suitable from the viewpoint of the hardness and corrosion-resistant properties. Moreover, in order to reduce the attacking property of the seal ring to the side surface of the sliding partner material, it is desirable that the particle shape thereof be flake.

Moreover, the compound ratio of the powder to the seal ring (constituent for manufacturing the seal ring) is preferably set in a range from 1 vol % to 30 vol % inclusive, and more preferably, in a range from 5 vol % to 25 vol % inclusive. If the compound ratio of the metal powder is less than 1 vol %, then the improving effect ointhe load-resistant property is sometimes not recognized, and if the compound ratio exceeds 30 vol %, then it becomes difficult to mold the constituents into the seal ring.

In order to improve the abrasion-resistant property of the seal ring of the present invention, which comprises the fluororesin, in addition to the above-described metal powder, modified fluororesin is compounded, which is fabricated under an inert gas atmosphere with an oxygen partial pressure of 1.33 kPa or less by irradiation of an ionizing radiation heated up to more than the melting point of the fluororesin in a range from 1 kGy to 10 MGy inclusive.

The fluororesin modified under the above-described conditions has a bridged structure in molecular chains. Therefore, it is made possible to improve the abrasion-resistant property to a great extent by compounding the modified fluororesin with the conventional fluororesin.

Here, if the oxygen partial pressure in the inert gas atmosphere exceeds 1.33 kPa (=10 torr), then oxygen is bonded to the portion of the fluororesin, which is activated by the ionizing radiation, and thus a recombination reaction forming the above-described bridged structure is prone to inhibition.

Moreover, if the ionizing radiation amount is less than 1 kGy, then the partial decomposition reaction of the fluororesin becomes difficult to progress, and the bridged structure is difficult to form. On the other hand, if the ionizing radiation amount exceeds 10 MGy, only partial decomposition reaction of the fluororesin is progressed, and the formation of the bridged structure by the above-described recombination reaction is prone to inhibition.

The addition of only the metal powder under the severe sliding condition of PV=40 MPa·m/s or more causes the self-abrasion of the fluororesin, leading to incapability of retaining the sealing property. Therefore, in the present invention, the above-described fluororesin is compounded for the purpose of further improving the abrasion-resistant property of the fluororesin.

The modified fluororesin irradiated with the ionizing radiation is compounded, with respect to the total compounded amount of the fluororesin (sum of the fluororesin and the modified fluororesin), in a ratio ranging from 5 vol % to 50 vol % inclusive, and preferably, in a ratio ranging from 10 vol % to 30 vol % inclusive. If the compounded amount of the modified fluororesin is less than 5 vol %, the improving effect of the abrasion-resistant property of the fluororesin itself is not recognized. If the amount exceeds 50 vol %, it becomes difficult to mold the constituents into the seal ring.

Furthermore, because the fluororesin exhibits an oil repellent property due to the smallness of its surface energy, the seal ring cannot retain the oil film of the sliding surface particularly under high surface pressure where the oil film is thinned. Therefore, the amount of friction torque and self-abrasion are undesirably increased.

Accordingly, in the present invention, in order to improve the oil-film retention property of the seal ring made of the fluororesin, the following synthetic resin is compounded with the fluororesin serving as the base material. This synthetic resin is resin having a surface energy ranging from +0 N/cm to $20 \times 10^{-5}$ N/cm inclusive with respect to the surface energy of the operating oil to be hermetically sealed. With such compounding, the oil retention property of the sliding portions is improved, and thus it is made possible to slide the seal ring made of the fluororesin under high surface pressure.

Usually, in order to improve the oil-film retention property of the seal ring, minute unevenness is provided on the sliding surface thereof, grooves for retaining the oil film are set thereon, and so on. However, with regard to this minute unevenness and the grooves, in a fluororesin-made seal ring manufactured by a molding method other than injection molding, it is necessary to add machine work after the molding. Therefore, a cost increase is incurred due to the increase of the production processes, and as the sliding surface is being abraded, the oil-film retention performance thereof is lowered.

Regarding the above-described matter, in the present invention, the synthetic resin having the surface energy equivalent to or more than that of the operating oil to be hermetically sealed is added to the fluororesin. Therefore, an addition to the production process is eliminated, and even if the sliding surface is abraded, the oil-film retention performance is not lowered. Hence, it is made possible to secure the oil film for a long period under conditions where high surface pressure is applied.

Here, in order to retain good wettability with the operating oil to be hermetically sealed, it is necessary for the synthetic resin used in the present invention to have a surface energy ranging from +0 N/cm to $20 \times 10^{-5}$ N/cm inclusive with respect to the surface energy of the operating oil.

If synthetic resin having a surface energy out with the above-described range is compounded with the fluororesin, the improving effect of the oil retention property cannot be recognized under conditions where surface pressure more than 4 MPa is applied, and the abrasion of the seal ring itself is increased. The surface energy of general operating oil for an automatic transmission is approximately $30 \times 10^{-5}$ N/cm, and it is preferable for the synthetic resin to have a surface energy more than this in order to generate the wetness. However, if a difference in surface energy between the metal surface of the partner material and the synthetic resin exceeds $20 \times 10^{-5}$ N/cm, then formation of an even oil film on the sliding surface is prone to inhibition. Therefore, for the synthetic resin concerned, synthetic resin having a surface energy more than that of the operating oil, in which the difference in surface energy with the partner metal material is small, is suitable. As a synthetic resin material satisfying the conditions as described above, polyamideimide resin is the optimum, which can be suitably used in the present invention.

Moreover, it is preferable to compound the synthetic resin having the above-described predetermined surface energy with the seal ring of the present invention in a ratio ranging from 5 vol % to 50 vol % inclusive, and more preferably, in a ratio ranging from 5 vol % to 30 vol % inclusive with respect to the seal ring, specifically, the resin constituents for manufacturing the seal ring.

If the ratio of the compounded amount of the synthetic resin is less than 5 vol %, the improving effect of the wettability with the above-described operating oil to be hermetically sealed may sometimes not be obtained. If the ratio exceeds 50 vol %, then the friction torque of the sliding surface may sometimes be increased.

Although the present invention will be described below in more detail based on examples and comparative examples, the present invention is not limited to these examples.

EXAMPLE 1

For the fluororesin serving as the base material of the seal ring 10, tetrafluoroethylene with an excellent low friction torque property among fluororesins was used. The molding powder of this resin (G-163 made by Asahi Glass Company) was irradiated with an electron beam (acceleration voltage of 2 MeV) by exposure to 100 kGy under an atmosphere with an oxygen partial pressure of 0.133 kPa (1 Torr), a nitrogen partial pressure of 106.4 kPa (800 Torr) and a heating condition of 350° C. Thus, modified fluororesin was produced. Then, this modified resin was milled by a jet mill until a mean particle diameter thereof reached approximately 20 $\mu$m.

Next, the above-described modified fluororesin of 25 vol % was compounded with unmodified tetrafluoroethylene molding powder (G-163 made by Asahi Glass Company) of 65 vol %. Moreover, as the metal powder having a Vickers hardness equivalent to or more than that of the partner material, stainless steel flake powder (St-S400 mesh made by Fukuda Metal Foil & Powder Co., Ltd.) of 10 vol % was added in the compounded powder. This stainless steel flake powder was selected because it was harder than an aluminum die-cast material being used as the shaft member 12 of the automatic transmission, had a flake shape, and has an excellent corrosion-resistant property in the operating oil 28.

The above-described powder compound was sufficiently mixed by a mixer, and was then processed by heat at 300° C. for 12 hours. Thus, high-temperature volatile components were removed. Next, the powder compound was pre-molded into a cylindrical shape under a molding pressure of 50 MPa. Thereafter, the pre-molded compound was baked in an electric furnace at a temperature ranging from 350 to 400° C. for 3 hours.

Figure 3:
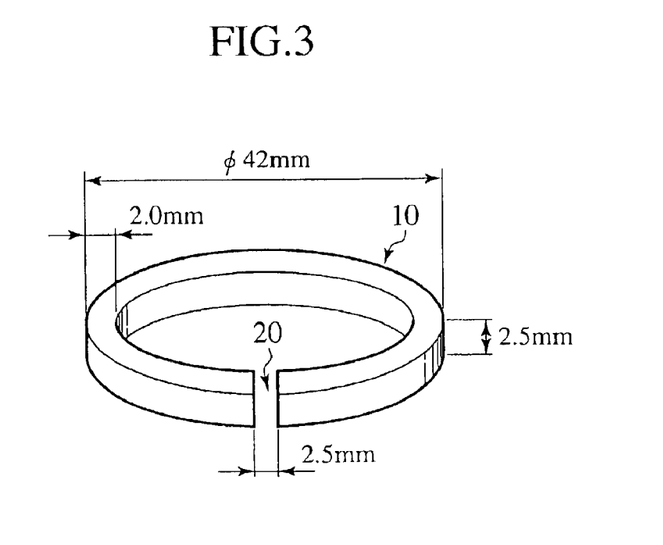
FIG. 3 is a perspective view showing the shape of the seal ring used in an abrasion test performed for confirming an improving effect in the sliding property of the seal ring of the present invention.

The fluororesin composition obtained by the baking was machined by a lathe into the seal ring 10 having the straight gap 20, which is illustrated in FIG. 3. Thus, the seal ring of this example was obtained.

EXAMPLE 2

Similarly to Example 1, the modified fluororesin of 20 vol % was compounded with the unmodified tetrafluoroethylene molding powder (G-163 made by Asahi Glass Company) of 50 vol %. Moreover, as the metal powder having a Vickers hardness equivalent to or more than that of the partner material, the stainless steel flake powder (St-S400 mesh made by Fukuda Metal Foil & Powder Co., Ltd.) of 10 vol % was added in the compounded powder. Furthermore, as the synthetic resin having the surface energy ranging from +0 N/cm to 20×10$^{-5}$ N/cm inclusive with respect to the surface energy of the operating oil to be hermetically sealed, polyamideimide powder (TORLON 4203L made by Amoco) of 20 vol % was added in the compounded powder.

Note that the polyamideimide was selected as the above-described synthetic resin because, as shown in the following Table 1, it had a surface energy larger than the operating oil for automatic transmission (Matic J made by Idemitsu Kosan Co., Ltd.) 28 used in an actual unit, and also, because the difference thereof in surface energy with the aluminum die-cast material that was being used as the shaft member 12 of the automatic transmission was minimum.

TABLE 1

| Material | Surface energy (10$^{-5}$ N/cm) |
|---|---|
| Polytetrafluoroethylene (PTFE) | 19.3 |
| Polyetheretherketone (PEEK) | 45.3 |
| Polyamide 46 (PA46) | 40.2 |
| Polyethersulfone (PES) | 47.4 |
| Polyamideimide (PAI) | 31.8 |
| Aluminum die-cast material | 33.4 |
| Operating oil for automatic transmission (Matic J made by Idemitsu Kosan Co., Ltd.) | 30.5 |

The above-described compound powder was machined into the seal ring 10 illustrated in FIG. 3 under similar conditions to those of Example 1. Thus, the seal ring of this example was obtained.

EXAMPLE 3

Similarly to Example 1, as the metal powder having a Vickers hardness equivalent to or more than that of the partner material, the stainless steel flake powder (St-S400 mesh made by Fukuda Metal Foil & Powder Co., Ltd.) of 10 vol % was compounded with the unmodified tetrafluoroethylene molding powder (G-163 made by Asahi Glass Company) of 70 vol %. Moreover, as the synthetic resin having a surface energy ranging from +0 N/cm to 20×10$^{-5}$ N/cm inclusive with respect to the surface energy of the operating oil to be hermetically sealed, polyamideimide powder (TORLON 4203L made by Amoco) of 20 vol % was added in the compounded powder.

The above-described compound powder was machined into the seal ring 10 illustrated in FIG. 3 under similar conditions to those of Example 1. Thus, the seal ring of this example was obtained.

EXAMPLE 4

Similarly to Example 1, the modified fluororesin of 20 vol % was compounded with the unmodified tetrafluoroethylene molding powder (G-163 made by Asahi Glass Company) of 40 vol %. Moreover, as the synthetic resin having a surface energy ranging from +0 N/cm to 20×10$^{-5}$ N/cm inclusive with respect to the surface energy of the operating oil to be hermetically sealed, polyamideimide powder (TORLON 4203L made by Amoco) of 22 vol % was added in the compounded powder. Furthermore, as the metal powder having a Vickers hardness equivalent to or more than that of the partner material, the stainless steel flake powder (St-S400 mesh made by Fukuda Metal Foil & Powder Co., Ltd.) of 18 vol % was added in the compounded powder.

The above-described compound powder was machined into the seal ring 10 illustrated in FIG. 3 under the similar conditions to those of Example 1. Thus, the seal ring of this example was obtained.

EXAMPLE 5

Similarly to Example 1, the modified fluororesin of 17 vol % was compounded with the unmodified tetrafluoroethylene molding powder (G-163 made by Asahi Glass Company) of 38 vol %. Moreover, as the synthetic resin having the surface energy ranging from +0 N/cm to 20×10$^{-5}$ N/cm inclusive with respect to the surface energy of the operating oil to be hermetically sealed, polyamideimide powder (TORLON 4203L made by Amoco) of 20 vol % was added in the compounded powder, and as the metal powder having a Vickers hardness equivalent to or more than that of the partner material, the stainless steel flake powder (St-S400 mesh made by Fukuda Metal Foil & Powder Co., Ltd.) of 10 vol % was added in the compounded powder. Furthermore, as a solid lubricant, oxybenzoyl polyester powder (Sumikasuper E101S made by Sumitomo chemical Co., Ltd.) of 15 vol % was added in the compounded powder.

The above-described compound powder was machined into the seal ring 10 illustrated in FIG. 3 under the similar conditions to those of Example 1. Thus, the seal ring of this example was obtained.

COMPARATIVE EXAMPLE 1

Graphite powder (SGL with a particle diameter of 3 μm, made by SEC Corporation) of 21 vol % and carbon fiber (Kreca Chop M-2007S with a fiber diameter of 14.5 μm and a fiber length of 90 μm, made by Kureha Chemical Industry Co., Ltd.) of 12 vol % were added in unmodified tetrafluoroethylene molding powder (G-163 made by Asahi Glass Company) of 67 vol %.

The above-described powder compound was mixed by a mixer, and then was pre-molded into a cylindrical shape under a molding pressure of 50 MPa. Subsequently, the pre-molded compound was baked in an electric furnace at a temperature ranging from 350 to 400° C. for 3 hours. The baked fluororesin is machined by a lathe into the seal ring 10, illustrated in FIG. 3, and the seal ring in this example is obtained.

COMPARATIVE EXAMPLE 2

The modified fluororesin of Example 1 of 35 vol % was compounded with unmodified tetrafluoroethylene molding powder (G-163 made by Asahi Glass Company) of 65 vol %. The obtained compound was sufficiently mixed by a mixer, and was then processed by heat at 300° C. for 12 hours. Thus, high-temperature volatile components were removed. Next, the powder compound was pre-molded into a cylindrical shape under a molding pressure of 50 MPa, and subsequently, was baked in an electric furnace at a temperature ranging from 350 to 400° C. for 3 hours. The baked fluororesin is machined by a lathe into the seal ring 10, illustrated in FIG. 3, and the seal ring in this example is obtained.

COMPARATIVE EXAMPLE 3

As the metal powder having a Vickers hardness equivalent to or more than that of the partner material, the stainless steel flake powder (St-S400 mesh made by Fukuda Metal Foil & Powder Co., Ltd.) of 30 vol % was compounded with the unmodified tetrafluoroethylene molding powder (G-163 made by Asahi Glass Company) of 70 vol %.

The obtained powder compound was sufficiently mixed by a mixer, and the powder compound was pre-molded into a cylindrical shape under a molding pressure of 50 MPa, and subsequently, was baked in an electric furnace at a temperature ranging from 350 to 400° C. for 3 hours. The baked fluororesin is machined by a lathe into the seal ring 10, illustrated in FIG. 3, and the seal ring in this example is obtained.

COMPARATIVE EXAMPLE 4

Bronze powder (Bro-Atw-350 made by Fukuda Metal Foil & Powder Co., Ltd.) of 21 vol % and carbon fiber (Kreca Chop M-2007S with a fiber diameter of 14.5 μm and a fiber length of 90 μm, made by Kureha Chemical Industry Co., Ltd.) of 12 vol % were added in unmodified tetrafluoroethylene molding powder (G-163 made by Asahi Glass Company) of 67 vol %.

The obtained powder compound was sufficiently mixed by a mixer, and the powder compound was pre-molded into a cylindrical shape under a molding pressure of 50 MPa, and subsequently, was baked in an electric furnace at a temperature ranging from 350 to 400° C. for 3 hours. The baked fluororesin is machined by a lathe into the seal ring 10, illustrated in FIG. 3, and the seal ring in this example is obtained.

COMPARATIVE EXAMPLE 5

The modified fluororesin of Example 1 of 20 vol % was compounded with unmodified tetrafluoroethylene molding powder (G-163 made by Asahi Glass Company) of 40 vol %. Moreover, as the synthetic resin having the surface energy ranging from +0 N/cm to 20×10$^{-5}$ N/cm inclusive with respect to the surface energy of the operating oil to be hermetically sealed, polyamideimide powder (TORLON 4203L made by Amoco) of 40 vol % was added in the compounded powder.

The obtained compound was sufficiently mixed by a mixer, and was then processed by heat at 300° C. for 12 hours. Thus, high-temperature volatile components were removed. Next, the powder compound was pre-molded into a cylindrical shape under a molding pressure of 50 MPa, and subsequently, was baked in an electric furnace at a temperature ranging from 350 to 400° C. for 3 hours. The baked fluororesin is machined by a lathe into the seal ring 10, illustrated in FIG. 3, and the seal ring in this example is obtained.

[Performance Evaluation]

Figure 4:
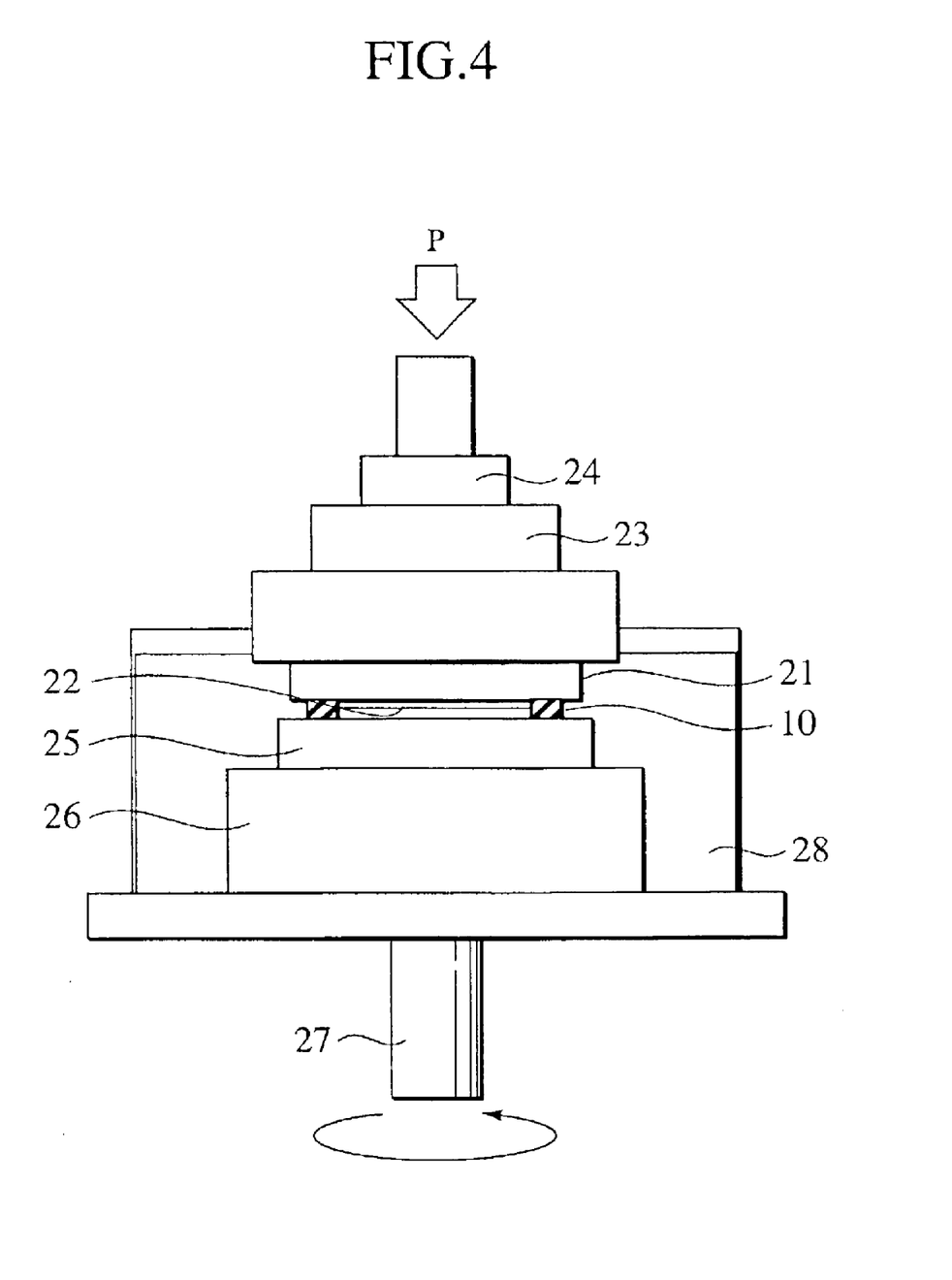
FIG. 4 is a schematic view of an abrasion test machine of a vertical ring-on-disc system, which is used in the abrasion test performed for confirming the improving effect in the sliding property of the seal ring of the present invention.

In order to confirm the improving effect of the sliding property of the present invention, an abrasion test was conducted in the operating oil for automatic transmission (Matic J made by Idemitsu Kosan Co., Ltd.) 28 for the seal rings of Examples 1 to 5 and Comparative examples 1 to 5 (refer to FIG. 4).

Figure 5:
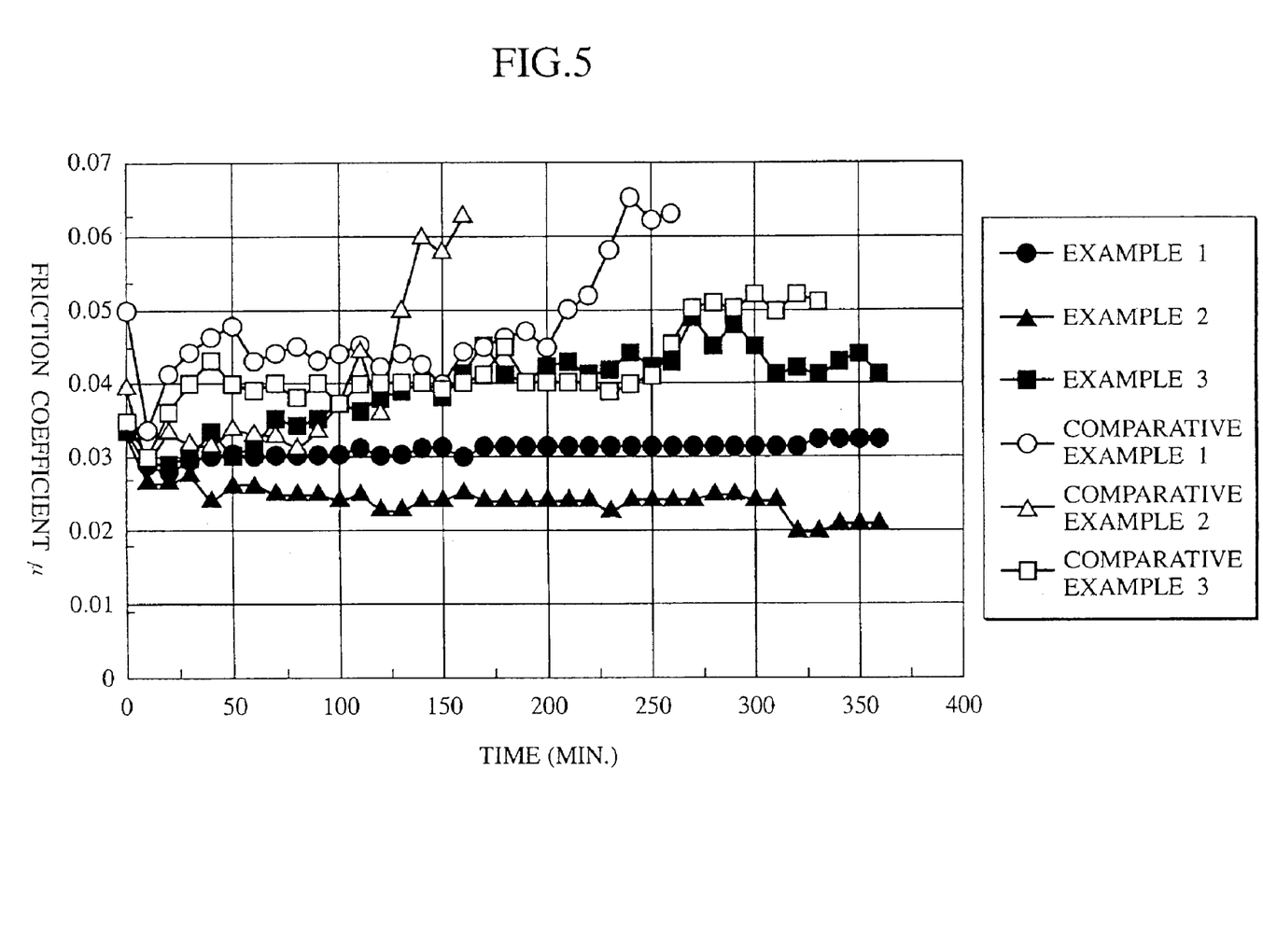
FIGS. 5 and 7 are graphs showing changes with time of friction coefficients.
Figure 6:
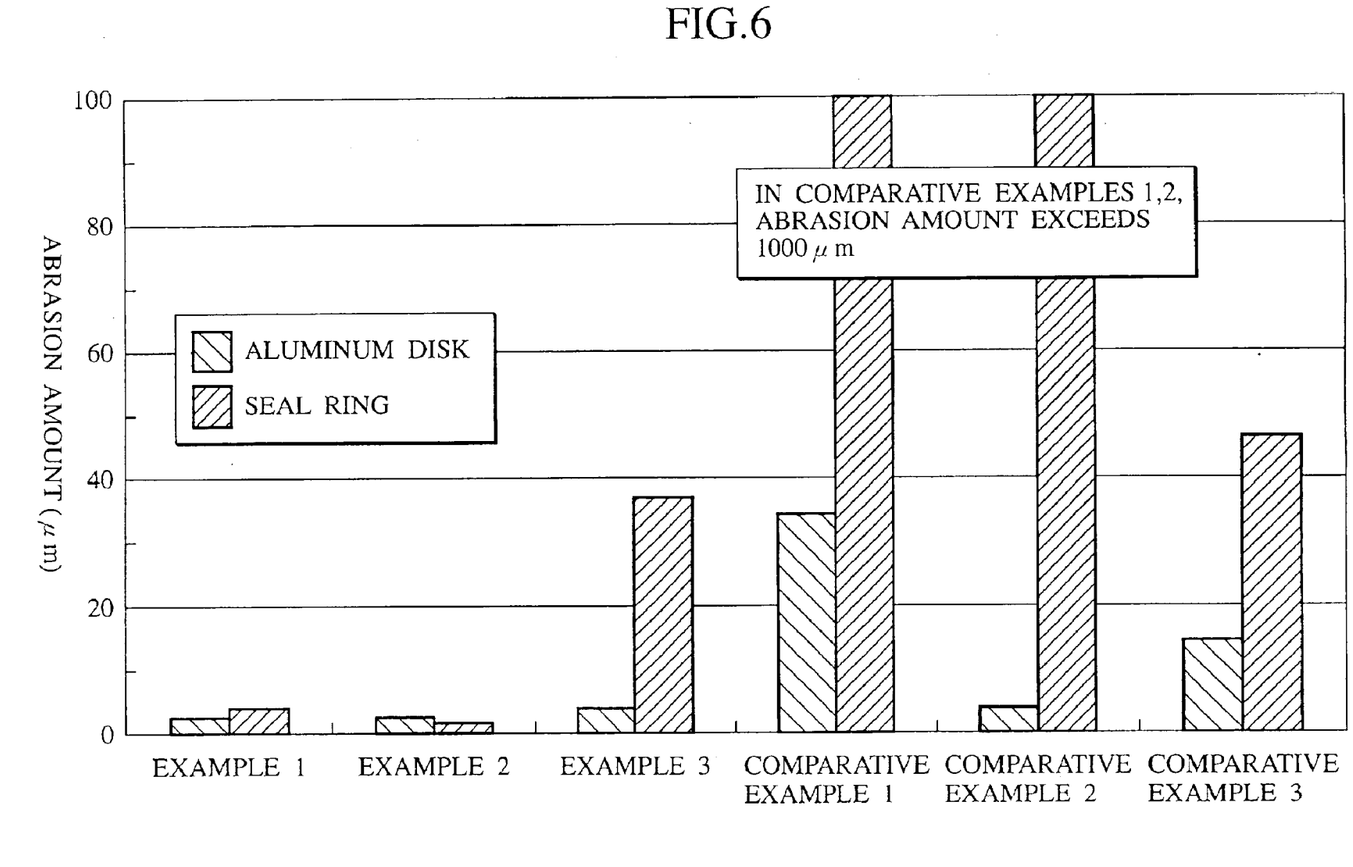
FIGS. 6 and 8 are graphs showing the abrasion amounts of the seal rings and the discs after the abrasion test.
Figure 7:
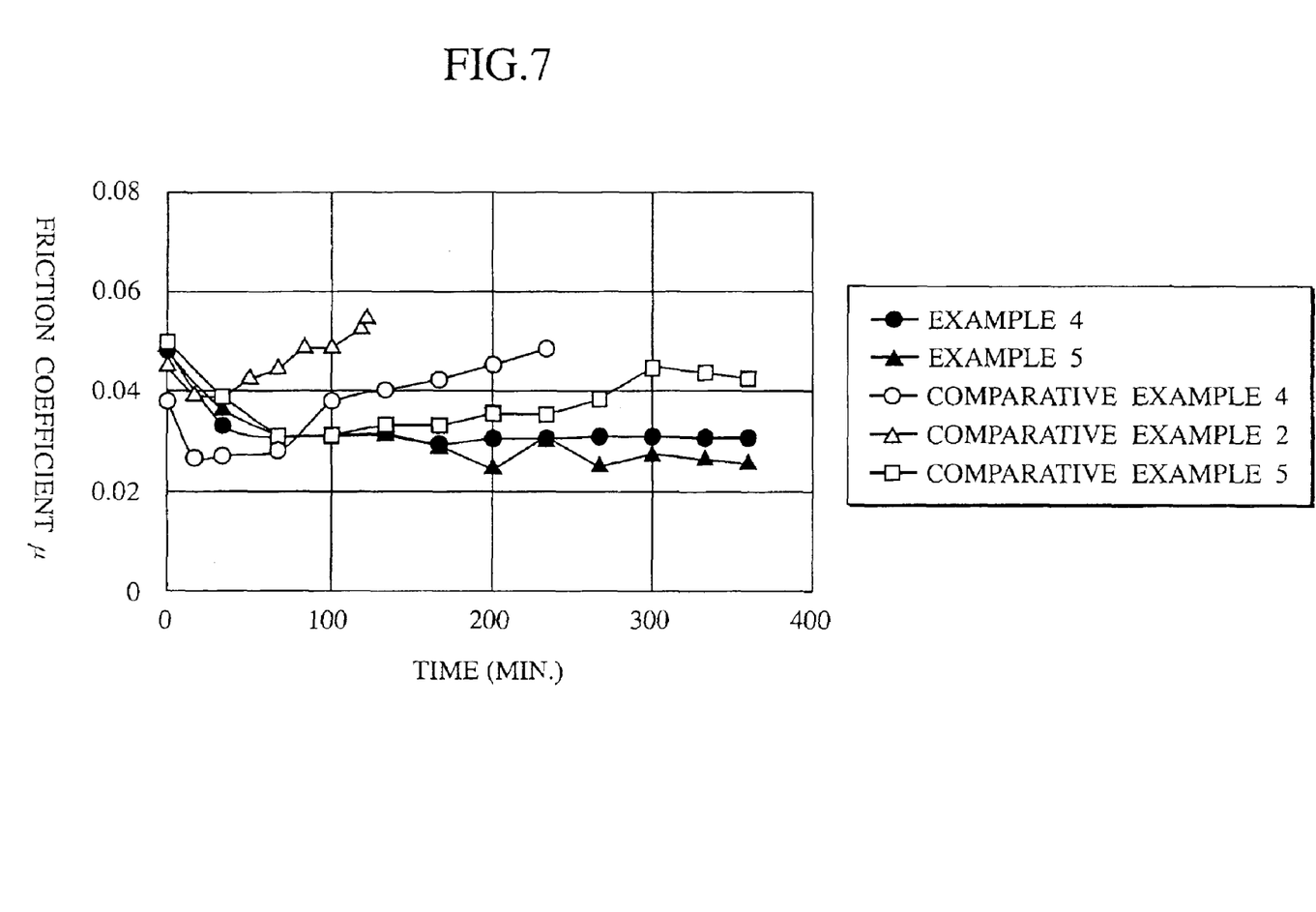
Figure 8:
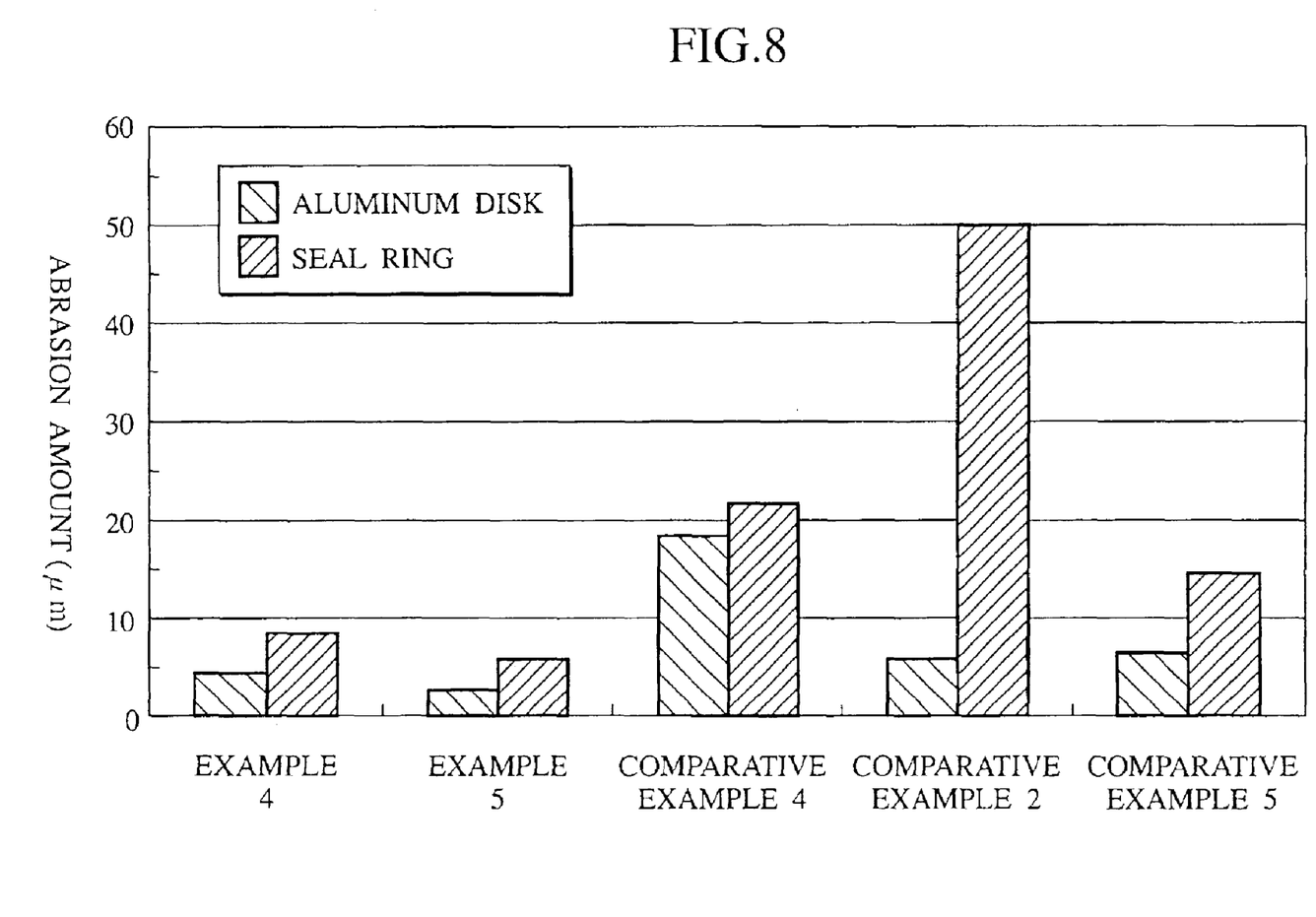

As a partner material, an aluminum die-cast material (ADC-12) that was being used for the shaft member 12 and the like of the automatic transmission based on the demand for reduction in weight thereof in recent years was selected. Moreover, for installation to the test device, the test piece shape of the aluminum die-cast material was set in a diameter of 60 mm and a thickness of 10 mm, and this test piece was defined as the disc 25. The surface roughness of the slidingly contacting surface thereof was set as: Ra=1 μm approximately in Examples 1 to 3 and Comparative examples 1 to 3, and set as: Ra=0.6 μm approximately in Examples 4 and 5 and Comparative examples 2, 4 and 5. Comparative example 2 has test pieces of two types, in which one of the test pieces has a surface roughness of 1 μm, and the other has a surface roughness of 0.6 μm. FIGS. 5 and 6 show results of the test piece having a surface roughness of 1 μm, and FIGS. 7 and 8 show results of the test piece having a surface roughness of 0.6 μm.

FIG. 4 schematically illustrates the friction and abrasion test machine of a vertical ring-on-disc system, which was used in this test. This test machine has the ring holder 21 on the upper portion thereof. The ring holder 21 was fixed by thrusting the outer circumferential surface 17b of the seal ring against the groove portion of the holder by means of the spring force of the snap ring 22 provided on the inner circumferential surface 17a side of the seal ring so as not to move in the diameter direction of the seal ring 10 during the sliding.

Meanwhile, the disc holder 26 coupled to the rotation shaft 27 was provided in the lower portion of the test machine. When the disc 25 was fixed to the disc holder 26 by bolts, the disc 25 freely rotated with respect to the seal ring 10. Next, the seal ring 10 and the disc 25 were clamped together with pressure by lowering the ring holder 21. At this time, the slidingly contacting portions of the seal ring 10 and the disc 25 were immersed in the operating oil for automatic transmission (Matic J made by Idemitsu Kosan Co., Ltd.) 28. Note that the reference numeral 23 denotes the load cell, and the reference numeral 24 denotes the torque detector.

FIGS. 5 to 8 show the results of the abrasion test conducted by use of the above-described test machine under test conditions where the clamped surface pressure was 4 MPa, the friction speed was 10 m/sec., and the test time was 6 hours.

FIG. 5 is a graph showing changes with time of friction coefficients during the abrasion test. In Examples 1 and 2 belonging to the scope of the present invention, the variations and absolute values of the friction coefficients during the abrasion test were smaller than those in Comparative examples 1 to 3, and the seal rings 10 of Examples 1 and 2 exhibited a good sliding property for the aluminum-made disc 25.

Meanwhile, in Example 3, the abrasion of the ring was occurred to some extent, and therefore, the friction coefficient thereof was increased in comparison with Examples 1 and 2. However, this friction coefficient was lowered in comparison with those of the seal rings 10 of Comparative examples 1 and 3 using an identical fluororesin to that of Example 3 as a base material. From the above, the reducing effect of the friction coefficient was recognized, which was caused by an improvement in the oil retention property due to the addition of the polyamideimide.

The above-described reduction effect of the friction coefficient by the polyamideimide was also be confirmed by comparing the friction coefficients of Examples 1 and 2.

Meanwhile, in Comparative examples 1 and 2, improvements in the abrasion-resistant and load-resistant properties were insufficient with respect to the abrasion test conditions. Therefore, an abnormal abrasion of the seal ring 10 occurred during the test, and the friction coefficient rapidly increased.

FIG. 6 is a graph showing the abrasion amounts of the seal rings 10 and the discs 25 after the abrasion test. Because the seal rings 10 of Examples 1 to 3 exhibited good sliding property for the aluminum material as described above, the abrasion amount of each disc 25 and the self-abrasion amount of each seal ring 10 were reduced in comparison with those of Comparative examples 1 to 3.

Particularly, the seal rings 10 of Examples 1 and 2 exhibited good sliding property for the aluminum material even under the test conditions of this time. Therefore, the abrasion amounts of both of each disc 25 and each seal ring 10 were small.

However, since the seal ring 10 of Example 3 did not have modified fluororesin added, the abrasion amount thereof was increased in comparison with those of Examples 1 and 2.

On the other hand, in Comparative examples 1 and 2, improvements in the load-resistant and the abrasion-resistant properties of the fluororesin were not sufficient. Therefore, an abnormal abrasion of each seal ring 10 occurred. Note that, in Comparative example 1 where the carbon fiber was added, the carbon fiber protruding from the sliding surface of the seal ring 10 abraded the aluminum disc 25 as the partner material. Therefore, not only the abrasion amount of the seal ring 10 but also the abrasion amount of the aluminum disc 25 was increased.

Moreover, as shown in FIG. 7, in Examples 4 and 5 belonging to the scope of the present invention, the variations and absolute values of the friction coefficients during the abrasion test were smaller than those in Comparative examples 2, 4 and 5, and each seal ring 10 of Examples 4 and 5 exhibited a good sliding property for the aluminum-made disc 25. Particularly, when comparing the seal rings of Examples 4 and 5 with the seal ring of Comparative example 4, which was made of the conventional general fluororesin, an approximately constant friction coefficient was exhibited through to the end of the test in each of Examples 4 and 5 while the friction coefficient in Comparative example 4 was greatly varied after the test time exceeded 100 minutes. From the above, it is understood that the seal ring 10 of the present invention can retain a stable sliding state for the aluminum material for a long period of time.

The compounding effect of the metal powder could be confirmed by comparing Example 4 with Comparative example 5. In Comparative example 5 where the metal powder was not compounded, the friction coefficient of the test steel plate was increased due to the creep deformation of the seal ring 10. On the other hand, in Example 4 where the metal powder was compounded, no creep occurred, and therefore, a constant friction coefficient was retained through to the end of the test.

Meanwhile, when Examples 4 and 5 of the present invention were compared with each other, in Example 5 where the solid lubricant was compounded, the absolute value of the friction coefficient was rather lowered. From the above, it is understood that it is possible to further reduce the abrasion torque by compounding the solid lubricant such as oxybenzoyl polyester.

FIG. 8 shows the abrasion amounts of the seal ring 10 and the disc 25 after the abrasion test. Since the seal rings 10 of Examples 4 and 5 exhibited a good sliding property for the aluminum material as described above, the abrasion amounts of the discs 25 and the self-abrasion amounts of the seal rings 10 were reduced in comparison with those of Comparative examples 2, 4 and 5. On the other hand, in Comparative example 4 where the carbon fiber was added, the carbon fiber protruding to the sliding surface of the seal ring abraded the aluminum disc 25 as the partner material, and further, the abraded sliding surface of the aluminum disc 25 abraded the seal ring 10. From the above, it is understood that the abrasion amounts of the seal ring 10 and the disc 25 are increased in Comparative example 4.

Moreover, in Comparative examples 2 and 5, creep deformations of the seal rings 10 occurred, resulting in an increase of the self-abrasion amounts of the seal rings 10.

From the above-described results of the abrasion test, the following is concluded. Specifically, the following can be said regarding the seal ring 10 added with the metal powder and the modified fluororesin, in which the metal powder has a Vickers hardness equivalent to or more than that of the sliding partner material, and the modified fluororesin is expressed by the irradiation of the ionizing radiation in the range from 1 kGy to 10 MGy inclusive in a state of being heated up to a melting point thereof or higher under an inert gas atmosphere with an oxygen partial pressure of 1.33 kPa or less. In the seal ring 10 described above, even in the case where the partner member is a non-iron metal such as an aluminum alloy, the abrasions of the partner member and the seal ring 10 itself are suppressed, thus making it possible to retain a good sealing property for a long period of time. In addition, since the friction torque of the slidingly contacting portion of the seal ring 10 is small, the seal ring 10 is optimal for a seal ring of automatic transmission. Moreover, by filling the synthetic resin having the surface energy ranging from +0 N/cm to 20×10$^{-5}$ N/cm inclusive with respect to a surface energy of the operating oil to be hermetically sealed, it is possible to further reduce the friction torque of the slidingly contacting portion of the seal ring 10. Furthermore, even if the sliding partner material is a non-iron metal such as an aluminum alloy, the attacking property of the seal ring to the partner material is reduced, thus making it possible to retain a good sealing property, and in addition, making it possible to reduce the friction torque of the sliding surface as much as possible. Consequently, an extremely excellent effect is induced, in which the seal ring 10 can contribute to the improvement of the fuel efficiency of the automobile.

Note that, according to the present invention, only the change of the filler material of the seal ring enables the improvement of the sliding property. Therefore, the basic design of the seal ring itself and manufacturing equipment thereof are not required to be changed, and thus an additional advantage is obtained, in which the sliding property can be improved at low cost.

The entire content of Japanese Patent Applications No. P2002-101571 with a filing date of Apr. 3, 2002 and P2002-266256 with a filing date of Sep. 12, 2002 is herein incorporated by reference.

Although the invention has been described above by reference to certain embodiments of the invention, the invention is not limited to the embodiments described above will occur to these skilled in the art, in light of the teachings. The scope of the invention is defined with reference to the following claims.

What is claimed is:

1. A seal ring which seals operating oil hermetically and is attached to an annular seal ring groove provided on an outer circumference of a shaft member, the seal ring comprising:

fluororesin;

metal powder having a hardness equal to or more than that of any of a side surface of the seal ring groove serving as a sliding partner and an inner circumferential surface of a housing engaged relatively rotatable with the outer circumference of the shaft member; and modified fluororesin formed by irradiating an ionizing radiation in a range from 1 kGy to 10 MGy inclusive in a state of being heated up to a melting point thereof or higher under an inert gas atmosphere with an oxygen partial pressure of 1.33 kPa or less, wherein the seal ring comprises an inner ring circumferential surface facing an inside thereof in a radius direction, an outer ring circumferential surface facing an outside thereof in the radius direction, and a pair of side ring surfaces facing both sides thereof in an axial direction, and when oil pressure is applied to the seal ring, the outer ring circumferential surface is pressed against the inner circumferential surface of the housing, one of the side ring surfaces is pressed against the side surface of the seal ring groove, thus retaining the oil pressure.

2. The seal ring of claim 1, further comprising:

synthetic resin having a surface energy ranging from +0 N/cm to 20×10$^{-5}$ N/cm inclusive of that of the operating oil.

3. The seal ring of claim 1, wherein an existence ratio of the modified fluororesin to a total amount of the fluororesin and the modified fluororesin ranges from 5 vol % to 50 vol % inclusive.

4. The seal ring of claim 1, wherein a ratio of the metal powder ranges from 1 vol % to 30 vol % inclusive in compositions of the seal ring.

5. The seal ring of claim 2, wherein a ratio of the synthetic resin ranges from 5 vol % to 50 vol % inclusive in compositions of the seal ring.

6. The seal ring of claim 1, wherein any of the side surface of the seal ring groove and the inner circumferential surface of the housing is formed by containing a light metal material, and the metal powder is any of bronze powder and stainless steel powder.

7. The seal ring of claim 2, wherein any of the side surface of the seal ring groove and the inner circumferential surface of the housing is formed by containing a light metal material, the metal powder is any of bronze powder and stainless steel powder, and the synthetic resin is polyamideimide resin.

8. The seal ring of claim 1, wherein the seal ring is used for a hydraulic seal for relatively rotating portions in an automatic transmission for a vehicle.

9. A seal ring which seals operating oil hermetically and is attached to an annular seal ring groove provided on an outer circumference of a shaft member, the seal ring comprising:

fluororesin;

synthetic resin having a surface energy ranging from +0 N/cm to 20×10$^{-5}$ N/cm inclusive of that of the operating oil; and metal powder having a hardness equal to or more than that of any of a side surface of the seal ring groove serving as a sliding partner and an inner circumferential surface of a housing engaged relatively rotatable with the outer circumference of the shaft member, wherein the seal ring comprises an inner ring circumferential surface facing an inside thereof in a radius direction, an outer ring circumferential surface facing an outside thereof in the radius direction, and a pair of side ring surfaces facing both sides thereof in an axial direction, and when oil pressure is applied to the seal ring, the outer ring circumferential surface is pressed against the inner circumferential surface of the housing, one of the side ring surfaces is pressed against the side surface of the seal ring groove, thus retaining the oil pressure.

10. The seal ring of claim 9, wherein a filling ratio of the synthetic resin ranges from 5 vol % to 50 vol % inclusive in compositions of the seal ring.

11. The seal ring of claim 9, wherein a particle shape of the metal power is flake, and a filling ratio of the metal powder ranges from 1 vol % to 30 vol % inclusive in compositions of the seal ring.

12. The seal ring of claim 9, wherein the synthetic resin is polyamideimide resin, and the metal powder is any of stainless steel flake and bronze powder.

13. The seal ring of claim 9, wherein the seal ring is used for a hydraulic seal for relatively rotating portions in an automatic transmission for a vehicle.

14. A hydraulics seal device, comprising:

a seal ring which seals operating oil hermetically and is attached to an annular seal ring groove provided on an outer circumference of a shaft member, the seal ring comprising:

fluororesin;

metal powder having a hardness equal to or more than that of any of a side surface of the seal ring groove serving as a sliding partner and an inner circumferential surface of a housing engaged relatively rotatable with the outer circumference of the shaft member; and modified fluororesin formed by irradiating an ionizing radiation in a range from 1 kGy to 10 MGy inclusive in a state of being heated up to a melting point thereof or higher under an inert gas atmosphere with an oxygen partial pressure of 1.33 kPa or less, wherein the seal ring comprises an inner ring circumferential surface facing an inside thereof in a radius direction, an outer ring circumferential surface facing an outside thereof in the radius direction, and a pair of side ring surfaces facing both sides thereof in an axial direction, when oil pressure is applied to the seal ring, the outer ring circumferential surface is pressed against the inner circumferential surface of the housing, one of the side ring surfaces is pressed against the side surface of the seal ring groove, thus retaining the oil pressure, and the seal ring slidingly contacts any of the side surface of the seal ring groove of the shaft member and the inner circumferential surface of the housing.

15. A hydraulics seal device, comprising:

a seal ring which seals operating oil hermetically and is attached to an annular seal ring groove provided on an outer circumference of a shaft member, the seal ring comprising:

fluororesin;

synthetic resin having surface energy ranging from +0 N/cm to $20 \times 10^{-5}$ N/cm inclusive of surface energy of the operating oil; and metal powder having a hardness equal to or more than that of any of a side surface of the seal ring groove serving as a sliding partner and an inner circumferential surface of a housing engaged relatively rotatable with the outer circumference of the shaft member, wherein the seal ring comprises an inner ring circumferential surface facing an inside thereof in a radius direction, an outer ring circumferential surface facing an outside thereof in the radius direction, and a pair of side ring surfaces facing both sides thereof in an axial direction, when oil pressure is applied to the seal ring, the outer ring circumferential surface is pressed against the inner circumferential surface of the housing, one of the side ring surfaces is pressed against the side surface of the seal ring groove, thus retaining the oil pressure, and the seal ring slidingly contacts any of the side surface of the seal ring groove of the shaft member and the inner circumferential surface of the housing.

16. The hydraulics seal device of claim 14, wherein the seal ring includes synthetic resin having a surface energy ranging from +0 N/cm to $20 \times 10^{-5}$ N/cm inclusive of that of the operating oil.

17. The hydraulics seal device of claim 16, wherein a ratio of the synthetic resin ranges from 5 vol % to 50 vol % inclusive in compositions of the seal ring.

18. The hydraulics seal device of claim 14, wherein any of the side surface of the seal ring groove and the inner circumferential surface of the housing is formed by containing a light metal material, and the metal powder is any of bronze powder and stainless steel powder.

19. The hydraulics seal device of claim 16, wherein any of the side surface of the seal ring groove and the inner circumferential surface of the housing is formed by containing a light metal material, the metal powder is any of bronze powder and stainless steel powder, and the synthetic resin is polyamideimide resin.

* * * * *